United States Patent
Marinier et al.

(10) Patent No.: US 7,046,655 B2
(45) Date of Patent: May 16, 2006

(54) WIRELESS COMMUNICATION METHOD AND SYSTEM FOR MINIMIZING INTERFERENCE BY DETERMINING MOBILE STATION ZONE LOCATIONS AND POTENTIAL CONFLICTS BETWEEN CELL ZONES

(75) Inventors: Paul Marinier, Brossard (CA); Vincent Roy, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/334,459

(22) Filed: Dec. 30, 2002

(65) Prior Publication Data

US 2004/0032850 A1 Feb. 19, 2004

Related U.S. Application Data

(60) Provisional application No. 60/403,685, filed on Aug. 15, 2002.

(51) Int. Cl.
*H04Q 7/00* (2006.01)
*H04Q 7/20* (2006.01)
*H04B 7/212* (2006.01)

(52) U.S. Cl. .................... 370/347; 370/329; 455/452.1

(58) Field of Classification Search ................ 370/310, 370/328, 329, 339, 441, 442, 479, 480, 498, 370/280, 275, 276, 277, 465, 330, 347, 377, 370/336; 455/422, 450, 452, 456, 509, 513, 455/515, 517, 523, 69, 562, 522, 562.1, 452.2, 455/447–448

See application file for complete search history.

(56) References Cited

U.S. PATENT DOCUMENTS 5,594,720 A * 1/1997 Papadopoulos et al. ..... 370/330
5,603,082 A * 2/1997 Hamabe ...................... 455/450
5,613,200 A * 3/1997 Hamabe ................... 455/452.2
5,649,292 A * 7/1997 Doner .......................... 455/447
5,822,699 A * 10/1998 Kotzin et al. ................ 455/447
5,901,355 A * 5/1999 Doner .......................... 455/447
5,930,716 A * 7/1999 Sonetaka ..................... 455/450
6,122,260 A * 9/2000 Liu et al. ..................... 370/280
6,137,993 A * 10/2000 Almgren et al. ............ 455/522
6,141,335 A * 10/2000 Kuwahara et al. .......... 370/342
6,144,652 A * 11/2000 Avidor et al. ............... 370/336
6,181,918 B1 * 1/2001 Benveniste .................. 455/450
6,223,031 B1 * 4/2001 Naslund .................... 455/562.1

(Continued)

FOREIGN PATENT DOCUMENTS

DE 199 28 579 1/2001
EP 1 229 671 8/2002

*Primary Examiner*—Steven HD Nguyen
(74) *Attorney, Agent, or Firm*—Volpe and Koenig, P.C.

(57) ABSTRACT

A wireless communication method and system for minimizing severe interference to one or more wireless transmit/receive unit (WTRUs). A plurality of non-overlapping zones (e.g., an inner zone and an outer zone) is defined for each cell of a wireless multi-cell communication system, such as a time division duplex (TDD) system. Information regarding potential conflicts between the non-overlapping cell zones is obtained. Each potential conflict indicates that there is a high likelihood of one of the WTRUs using a specific time slot for transmitting in a zone of one cell causing severe interference to a second one of the WTRUs using the specific time slot for receiving in a zone of another (i.e., a different) cell. Time slot usage (e.g., uplink, downlink or none) is then determined on a zone-by-zone basis using the obtained information to minimize interference caused by a conflicting uplink assignment or a conflicting downlink assignment.

18 Claims, 2 Drawing Sheets

U.S. PATENT DOCUMENTS

| | | | |
|---|---|---|---|
| 6,223,041 B1 * | 4/2001 | Egner et al. | 455/452.2 |
| 6,259,922 B1 * | 7/2001 | Benveniste | 455/452.1 |
| 6,266,537 B1 * | 7/2001 | Kashitani et al. | 455/522 |
| 6,353,598 B1 * | 3/2002 | Baden et al. | 455/448 |
| 6,466,767 B1 | 10/2002 | Lidbrink et al. | |
| 6,466,797 B1 * | 10/2002 | Frodigh et al. | 455/450 |
| 6,483,819 B1 * | 11/2002 | Take et al. | 370/329 |
| 6,487,414 B1 * | 11/2002 | Tanay et al. | 455/450 |
| 6,498,934 B1 * | 12/2002 | Muller | 455/452.1 |
| 6,560,462 B1 * | 5/2003 | Ravi et al. | 455/522 |
| 6,584,302 B1 * | 6/2003 | Hottinen et al. | 455/69 |
| 6,741,579 B1 * | 5/2004 | Choi et al. | 370/337 |
| 6,868,277 B1 * | 3/2005 | Cerwall et al. | 370/329 |
| 6,930,993 B1 * | 8/2005 | Hamada et al. | 370/347 |
| 2002/0105918 A1 * | 8/2002 | Yamada et al. | 370/347 |

* cited by examiner

*FIG. 3*

WIRELESS COMMUNICATION METHOD AND SYSTEM FOR MINIMIZING INTERFERENCE BY DETERMINING MOBILE STATION ZONE LOCATIONS AND POTENTIAL CONFLICTS BETWEEN CELL ZONES

CROSS REFERENCE TO RELATED APPLICATION(S)

This application claims priority from Provisional application No. 60/403,685; filed Aug. 15, 2002, which is incorporated by reference as if fully set forth.

BACKGROUND OF THE INVENTION

The present invention relates generally to radio communication systems using the time division duplexing (TDD) mode. More particularly, the invention relates to assignment of slots and slot-to-cell assignments in radio communication systems using TDD.

Cellular systems generally divide the time axis into intervals of equal durations called frames. Cellular systems employing the TDD scheme divide frames into a finite number of intervals of equal duration, called slots, and allow a cell to use some or all of the slots for uplink transmissions (mobile-to-base) or downlink (base-to-mobile) transmissions. The slot assignment of a cell defines how each slot is used by this cell. There are three possible ways for a cell to use a slot: uplink transmissions; 2) downlink transmissions; or 3) the slot is not used.

The slot assignment of a cell can be varied by the system in order to adapt to the long-term variations of the traffic load. For example, the system may modify the assignment of one slot from uplink to downlink if the intensity of downlink traffic increases while the uplink traffic decreases. In addition, different cells of a system do not generally need to have the same slot assignment. Accordingly, if traffic characteristics in one geographical area are different from another area, the cells covering those areas may have different slot assignments to best adapt to local traffic conditions.

In the prior art, a simple approach in order to avoid base-to-base and mobile-to-mobile interference is to use the same slot assignment for all cells in the same geographic area; only allowing different assignments between cells that are clearly isolated from each other. The obvious disadvantage of this approach is when cells are deployed in a way to provide continuous coverage, as is often the case, it is difficult to segregate one subset of cells from another, unless the use of certain slots are completely disallowed in some cells. This ultimately results in a capacity loss of the system.

Therefore, both mobile-to-mobile and base-to-base interference restrict the use of independent slot assignments between cells in the same geographical area. What is needed is a system which avoids the loss of capacity as the traffic asymmetry metric varies over a coverage area.

SUMMARY

The present invention is related to a wireless communication method and system for minimizing severe interference to one or more wireless transmit/receive unit (WTRUs). A plurality of non-overlapping zones are defined for each cell of a wireless multi-cell communication system, such as a TDD system. Information regarding potential conflicts between the non-overlapping cell zones is obtained. Each potential conflict indicates that there is a high likelihood of one of the WTRUs using a specific time slot for transmitting in a zone of one cell causing severe interference to a second one of the WTRUs using the specific time slot for receiving in a zone of another (i.e., a different) cell. Time slot usage (e.g., uplink, downlink or none) is then determined on a zone-by-zone basis using the obtained information to minimize interference caused by a conflicting uplink assignment or a conflicting downlink assignment. In one embodiment, the location of a WTRU is tracked by determining whether the WTRU is located in an inner or outer zone of a particular cell.

BRIEF DESCRIPTION OF THE DRAWING(S)

A more detailed understanding of the invention may be had from the following description of a preferred embodiment, given by way of example and to be understood in conjunction with the accompanying drawing wherein:

FIG. 3 is a look-up table showing zones that are conflicting with each other.

DETAILED DESCRIPTION OF THE PREFERRED EMBODIMENT(S)

Figure 1:
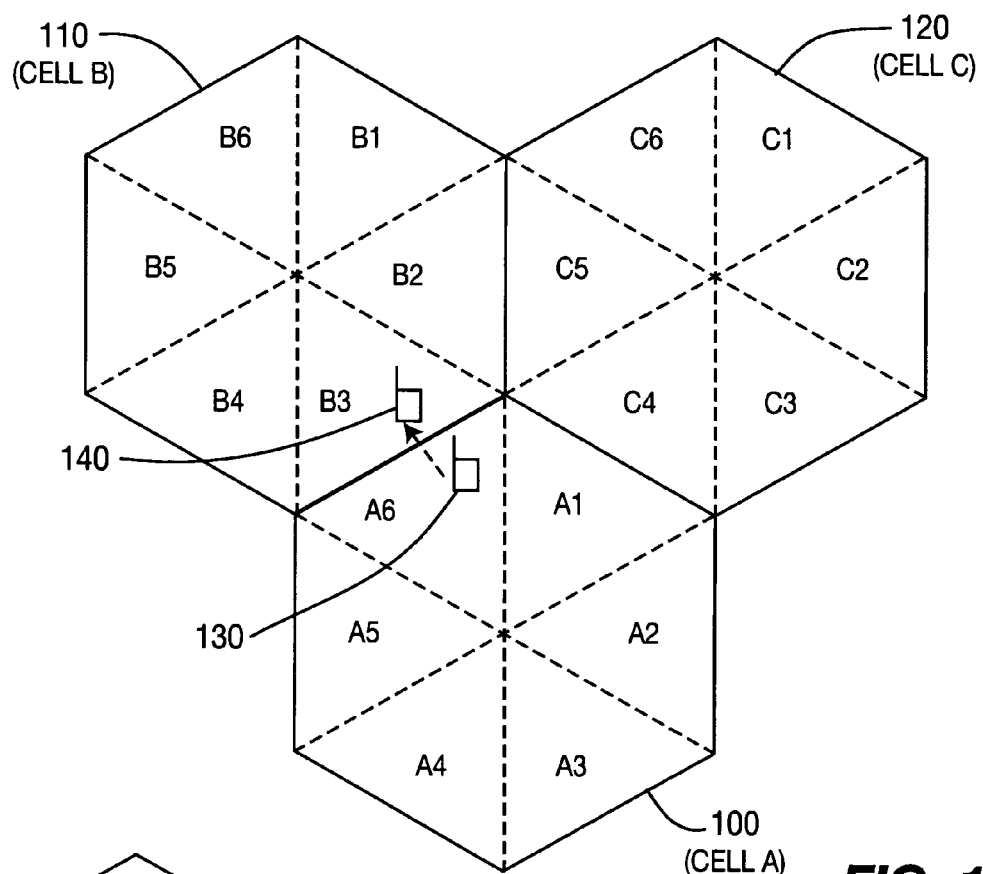
FIG. 1 shows an example of division of cells into zones.

The present invention will be described with reference to the drawing figures wherein like numerals represent like elements throughout.

Although the present invention will be described with reference to the example shown in FIG. 1 for the case of a hexagonal deployment, the present invention is readily extensible to other types of deployment. It is up to the system administrators and operators to define the zones according to their specific situations. The cell division shown in FIG. 1 is only an example of one type of cell division, it should be noted that in an actual deployment that there are other ways to divide cells into zones.

As illustrated in FIG. 1, cell A 100 has been divided into six (6) zones A1–A6 and likewise, the neighboring cells B 110 and C 120 have each been divided into six (6) zones B1–B6 and C1–C6, respectively. Several WTRUs 130, 140 are also randomly located. For the first embodiment it is assumed that the WTRUs are not equipped with adaptive antennas. The first WTRU 130 is located in sector A6 and a second WTRU 140 is located in sector B3.

The method and system of the present invention permit two neighboring cells to use conflicting slot assignments (i.e., a slot is used for the uplink in one cell but for the downlink in the neighboring cell) based on the concept of "zones." A zone is a subdivision of a cell defined by the system operator. Cells are divided in a certain number of (non-overlapping) zones. Two zones (belonging to different cells) are defined to be conflicting with each other if there is a high likelihood that a first WTRU transmitting in one zone would cause severe interference to a second WTRU receiving in the second zone. The determination of whether two zones are conflicting with each other can be made by analysis of the cell layout. Alternatively, one could envision a more sophisticated scheme based on collecting measurements made by WTRUs.

Although the method of determining conflicting zones will be described with reference to FIG. 3, this embodiment is illustrative and should not be construed as the only procedure for determining such conflicting zones. The conflicting zone lookup table in FIG. 3 facilitates determining the conflicting zones. For example, the first WTRU 130 is located in zone A6. Zone A6 is first located in the vertical column of the conflict lookup table. An X in its corresponding row indicates that zone B3 is a potential conflicting zone and a "⊙" in the table indicates an entry corresponding to a zone of the same cell (e.g. A1, A2, A3, A4 and A5). Because a slot cannot be used for both uplink and downlink simultaneously in the same cell, zones belonging to the same cell cannot be allowed to have opposing directions. This means that the transmissions from a first WTRU 130 in zone A6 have the potential to cause interference to a second WTRU 140 in zone B3. Interference would occur if both WTRUs 130 and 140 use the same slot for transmission and reception, respectively.

Having determined the conflicting zones, the physical resources can now be used more flexibly and efficiently. For example, suppose that it is desired that a given slot (S) be used for the uplink in cell A and in the downlink in cell B. Such a situation can happen if, for example, cell B has more downlink traffic than cell A. Without using the concept of zones, it would be difficult for cell A and cell B to use slot S in different directions. This is because a WTRU of cell A transmitting in slot S near the border of cell B would create too much interference to WTRUs receiving in slot S in cell B. However, when the concept of zones is used this problem is surmounted in the following way. Slot S can be used by some WTRUs of both cells A and B, provided that it is not used simultaneously by two WTRUs in conflicting zones. For example, suppose that zone A3 on FIG. 1 is not conflicting with any zone of cell B. Suppose also that slot S is used for the uplink in cell A and for the downlink in cell B. A WTRU in zone A3 would be allowed to use slot S (for the uplink) even though that slot may be used for the downlink in cell B. This represents a flexibility advantage and ultimately a capacity advantage, since otherwise slot S would have been completely unavailable for uplink in cell A.

Figure 3:
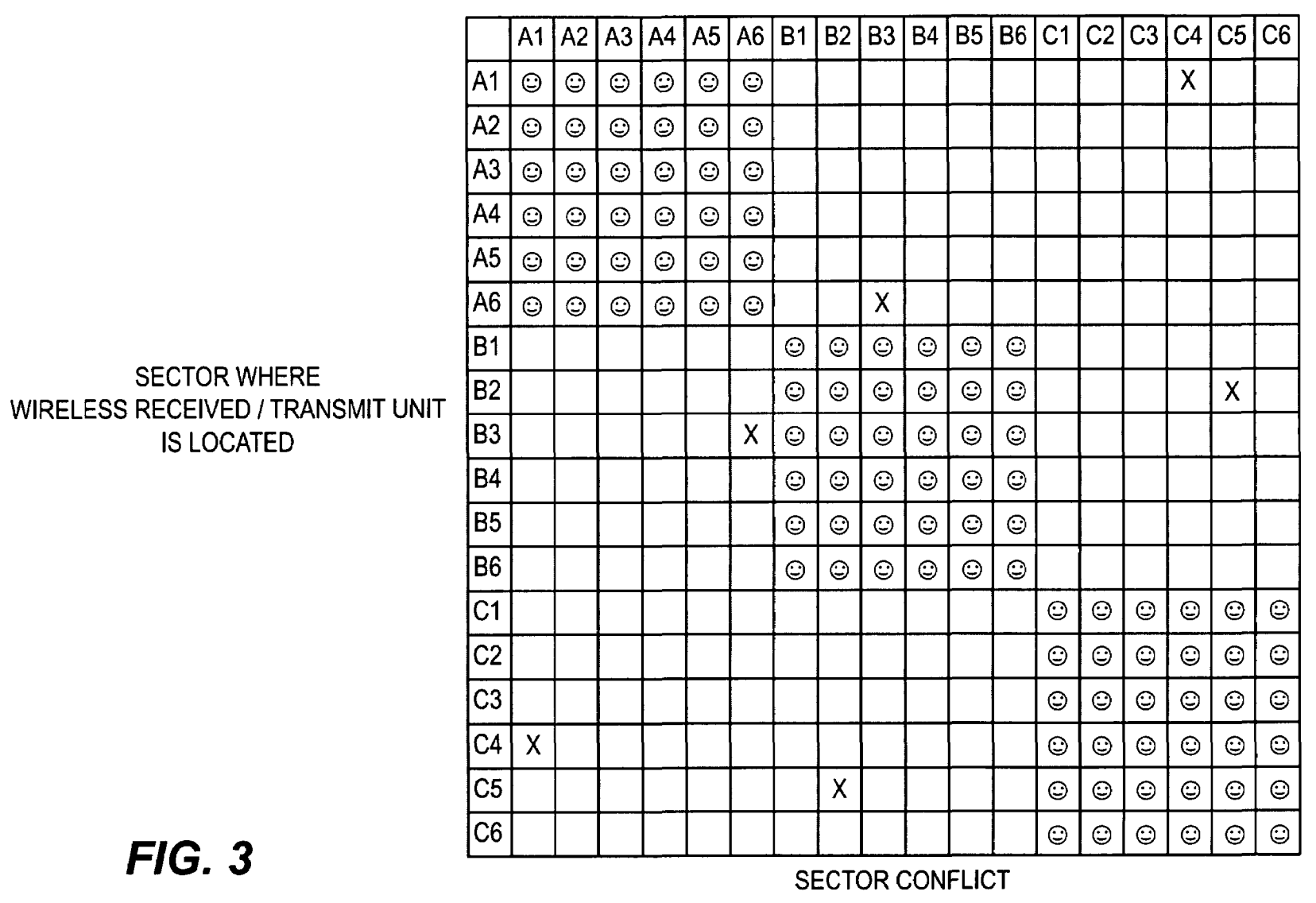

In the description of FIG. 3, it is assumed that the location of the WTRU is known. However, as the WTRU traverses through the coverage area, the system must keep track of the zone it is currently located in. For example, if the WTRU starts out in zone C3 and travels across the coverage area to zone B4, the WTRU would travel through zones C3, C4, B3 and B4 on its route. Based on the knowledge of the lookup table showing conflicting zones, the system can determine the best use of each slot (uplink, downlink or none) in every zone, taking into account the constraints imposed by the conflicts between zones and the average traffic characteristics. This is known as the slow dynamic channel allocation (SDCA) process, which occurs over a relatively large time scale (hours, days, weeks or months). The SDCA uses the conflict zone lookup table in this determination of slot usage.

Given the framework of slot usage defined by the SDCA process, when a WTRU connects to the system it is allocated at least one downlink channel in one or more of the slots which can be used for the downlink in the zone where it is located. It is also allocated at least one uplink channel in one or more of the slots that can be used for the uplink. Whenever a WTRU moves to another zone, the system checks if the channel allocation needs to be changed, a problem situation which can occur if the slot(s) used by this WTRU are no longer allowed in a given direction in the new zone it is moving in. This can be achieved by the fast dynamic channel allocation (FDCA) process. Therefore, there is no need to re-consult the conflicting zone lookup table every time a WTRU moves to a new zone. Rather, each zone is associated with a possible usage, uplink, downlink or none for every slot which is determined by the slow DCA based on the lookup table. The system uses this slot usage information when it is time to assign channels to a WTRU. The system then makes the appropriate non-interfering uplink and downlink slot assignments.

Figure 4:
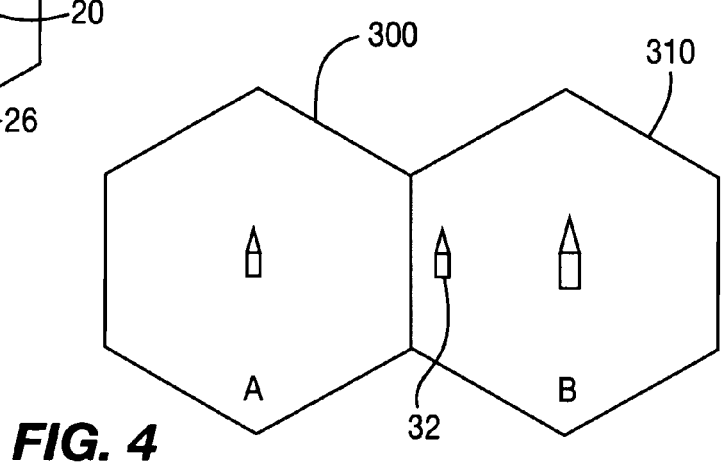
FIG. 4 illustrates the border of two neighboring cells and a WTRU in close proximity to the border.

Another advantage of the present invention is the use of slot allocation to affect load balancing. Referring to FIG. 4, if the traffic loads in each of two adjoining cells 300, 310 have differing asymmetry use characteristics, (that is, the first cell 300 is mostly downlink traffic, while the second cell 310 is mostly uplink traffic), without conflict zone management, the transmissions of WTRU 32 would cause interference with the first cell 310, if the cells are using the same slot for different directions. A fast allocation protocol could attempt employ an escape mechanism, which is a means for a channel allocation of a specific WTRU to be changed due to excessive interference as detected by a particular WTRU using this channel. The use of escape mechanisms is unsatisfactory since it would result in effectively forbidding the use of that slot in significant parts of the cell. Conflict zoning allows a mobile to traverse through a coverage area, (including zones), while having negligible impact on the cell's usage characteristics.

Figure 2:
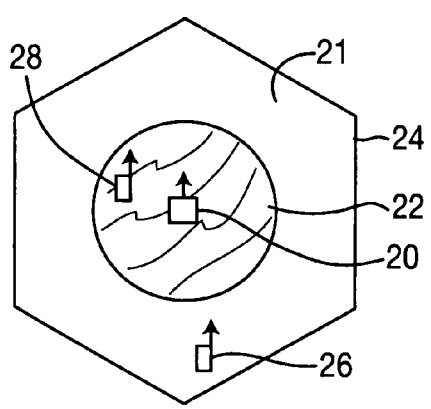
FIG. 2 illustrates how a cell can be segmented into two simple zones.

In an alternative embodiment in accordance with the present invention, a simple zone division scheme is used. A cell is separated into two zones as shown in FIG. 2. The first zone is the outer zone 21, which is defined by the coverage area 24 of the cell, (exclusive of the inner zone 22); and the second zone is the inner zone 22. The serving base station 20 is located at the center of the inner zone 22.

In one embodiment, the system determines both the cell in which the WTRU 28 is located and whether the WTRU is in an inner zone 22 or the outer zone 21. First measurements of the signal delay and the received signal power are performed. This allows the determination of whether WTRU 28 is located in the inner or outer zone. The example in FIG. 2, illustrates a WTRU 28 located in the inner zone 22, and the WTRU 26 is located in the outer zone 21.

Another method to determine location utilizes additional nearby base stations or other WTRU. However, because a WTRU requires constant tracking as it traverses the coverage area, there is a need for continuous system participation and coordination of the other base stations and WTRUs causing this to be a very resource intensive technique An additional technique to determine the location utilizes global positioning satellites of a Global Positioning System (GPS). A GPS receiver is put in each WTRU to identify the location of the WTRU. The coordinates are reported by the WTRU to the base station and the system uses the coordinates as aforementioned. However, there are some disadvantages with this option. The first is the need for the WTRU to be in a favorable position allowing it to properly receive the satellite signals (outdoors). Also, since the measurement is performed by the WTRU, the WTRU needs to constantly transmit location information to the system, which increases the signaling burden over the air interface and utilizes precious battery resources.

The consistency and accuracy of zone location is improved with adaptive antennas. The location measurements including inclination angle and signal level readings are employed to determine the position the WTRU. An advantage to adaptive antennas is that a position is obtained without the need of measurements from any other base stations or WTRUs. Therefore, adaptive antennas provide an efficient and independent means for tracking WTRUs.

The cellular system has two types of interference to cope with, the first is base-to-base interference and can occur when a first base station's downlink is another base station's uplink and the uplink base station receives the other base station's downlink, which impedes or degrades the intended uplink signal. The second type of interference that can occur in the cellular system (mobile-to-mobile interference) occurs when a first mobile's reception is impeded or degraded by another mobile's transmission.

Adaptive antennas can be placed at the base station, on the WTRUs or at both the base station and the WTRUs. The performance of the zone division scheme depends on basically two factors: 1) the effectiveness (i.e. reliability and convenience) with which one can determine the zone where a user is situated and the ability to track a moving user; 2) the size of the neighborhoods of the zones. The neighborhood of zone Z is defined as the set of other zones in other cells that conflict with zone Z. This means that the entries corresponding to Z and any zone belonging to the neighborhood of Z should be checked in the lookup table of FIG. 3.

The use of zones for slot allocation requires locating the WTRU with reasonable certainty. As the accuracy of the WTRU positioning is increased, it is possible to define a larger number of zones per cell, resulting in higher flexibility and increased efficiency of the system.

A small neighborhood is one defined as one with a small number of zones. This means that for every zone, there is a relatively small number of other zones that are conflicting with it. Thus, there are fewer constraints, which allow for more flexibility in the determination of the slot usage for every zone. This allows for the greatest flexibility in terms of assigning different proportions of uplink versus downlink traffic for different cells. Therefore, any scheme that tends to restrict the size of neighborhoods results in a gain of flexibility.

When two zones are conflicting with each other, this may be due to one or both of the following:
a) The probability of base-to-base interference is high if the zones are using slots in opposite directions
b) The probability of mobile-to-mobile interference is high if the zones are using slots in opposite directions.

When the mobiles are also equipped with adaptive antennas there will be less pairs of zones that are conflicting with each other because the overall probability of mobile-to-mobile interference is decreased. This is because mobiles equipped adaptive antennas tend to transmit and receive energy from specific directions, which reduces the probability that one mobile interferes with another. To say that there will be less pairs of zones that are conflicting with each other is the same as saying that the sizes of the neighborhoods of every zone is reduced under the definition of neighborhood of a zone.

The size of neighborhood depends of several factors, such as the specific geography of deployment or the propagation conditions present. If the mobiles are equipped with adaptive antennas, the neighborhood of a zone may be restricted to fewer zones. In the best case scenarios, a neighborhood can even be limited to only one or two zones, if the deployment is such that there are few scatterers around the mobiles. This is because the probability of mobile-to-mobile interference diminishes when mobiles are transmitting using narrow beams. Similarly, when adaptive antennas are used at the base station, the sizes of the neighborhoods should be reduced for the same reason.

In another embodiment the transmission power of mobiles is taken into account. The transmitted power is regarded as an important factor and influences the size of a neighborhood. If a zone Z is geographically defined as being close to the base station, any WTRUs transmitting in that zone will tend to transmit at a lower power level since they are closer to the base station and will need less power than other WTRUs that are further away. They per se generate less interference than other WTRUs and are less susceptible to the affect of other mobiles that would be receiving in the same timeslot. As a result, the number of zones that are conflicting with this zone Z tends to be smaller. In other words, a neighborhood of a zone close to the serving base station will normally be smaller than the neighborhood of a zone closer to the edge of the cell.

As stated above, mobiles normally transmit at a lower power when they are closer to their serving base station. But, with the advent of new high data rate cellular technology, an increase in power is often necessary to facilitate high data rate exchange at both the mobile and the base station. To accommodate the higher data rates, the WTRUs and the serving base station will have to increase transmission power, even if the WTRU is close to the serving base station. Therefore, it may be necessary to define service-dependent neighborhoods.

For example, it may be possible that two zones which are not conflicting with each other if the WTRUs are using the voice service or a low-rate service, but they would be conflicting if the WTRUs were using a high-rate service, for example a data rate of 384 kbps. In that case, a WTRU could be allowed to use a certain slot in a given zone only if it is using a low-rate service.

Although the present invention has been described in detail, it is to be understood that the invention is not limited thereto, and that various changes can be made therein without departing from the spirit and scope of the invention, which is defined by the attached claims.

What is claimed is:

1. A method of minimizing interference in a wireless multi-cell communication system that serves a plurality of wireless transmit/receive units (WTRUs), the method comprising:
    (a) defining a plurality of non-overlapping zones in a conflicting zone lookup table for each cell in the system;
    (b) obtaining information from the conflicting zone lookup table regarding potential conflicts between the non-overlapping cell zones, wherein the conflicting zone lookup table specifically identifies each of the zones of the cells, and each potential conflict indicates that there is a high likelihood of one of the WTRUs using a specific time slot for transmitting in one of the specifically identified zones of one cell causing severe interference to a second one of the WTRUs using the specific time slot for receiving in one of the specifically identified zones of another cell; and
    (c) determining time slot usage on a zone-by-zone basis using the information obtained from the conflicting zone lookup table to minimize interference caused by a conflicting uplink assignment or a conflicting downlink assignment.

2. The method of claim 1 wherein the wireless multi-cell communication system assigns channels to the WTRUs.

3. The method of claim 1 wherein a current zone location is determined for each of the WTRUs based on a signal delay measurement.

4. The method of claim 3 wherein the determination of the current zone location for each of the WTRUs is further based on a received power measurement.

5. The method of claim 3 wherein the current zone location identifies a specific cell of the system in which the WTRU is located.

6. The method of claim 3 wherein the non-overlapping zones include an inner zone and an outer zone, and the current zone location indicates whether the WTRU is located in the inner zone or the outer zone.

7. The method of claim 1 wherein the wireless multi-cell communication system is a time division duplex (TDD) system.

8. The method of claim 1 wherein the specific time slot can be simultaneously used by WTRUs in zones of different cells if the conflicting zone lookup table indicates that the different cell zones do not conflict.

9. The method of claim 1 wherein a slow dynamic channel allocation (SDCA) process is used to determine the best use of each time slot in each cell zone based on constraints imposed by conflicting zones indicated by the conflicting zone lookup table, and average traffic characteristics.

10. A wireless multi-cell communication system comprising:
   (a) a plurality of wireless transmit/receive units (WTRUs);
   (b) a plurality of cells, each of the cells having a plurality of non-overlapping zones;
   (c) means for obtaining information from a conflicting zone lookup table regarding potential conflicts between the non-overlapping cell zones, wherein the conflicting zone lookup table specifically identifies each of the zones of the cells, and each potential conflict indicates that there is a high likelihood of one of the WTRUs using a specific time slot for transmitting in one of the specifically identified zones of one cell causing severe interference to a second one of the WTRUs using the specific time slot for receiving in one of the specifically identified zones of another cell; and
   (d) means for determining time slot usage on a zone-by-zone basis using the information obtained from the conflicting zone lookup table to minimize interference caused by a conflicting uplink assignment or a conflicting downlink assignment.

11. The system of claim 10 wherein the wireless multi-cell communication system assigns channels to the WTRUs.

12. The system of claim 10 wherein a current zone location is determined for each of the WTRUs based on a signal delay measurement.

13. The system of claim 12 wherein the determination of the current zone location for each of the WTRUs is further based on a received power measurement.

14. The system of claim 12 wherein the current zone location identifies a specific cell of the system in which the WTRU is located.

15. The system of claim 12 wherein the non-overlapping zones include an inner zone and an outer zone, and the current zone location indicates whether the WTRU is located in the inner zone or the outer zone.

16. The system of claim 10 wherein the wireless multi-cell communication system is a time division duplex (TDD) system.

17. The system of claim 10 wherein the specific time slot can be simultaneously used by WTRUs in zones of different cells if the conflicting zone lookup table indicates that the different cell zones do not conflict.

18. The system of claim 10 wherein a slow dynamic channel allocation (SDCA) process is used to determine the best use of each time slot in each cell zone based on constraints imposed by conflicting zones indicated by the conflicting zone lookup table, and average traffic characteristics.

* * * * *

UNITED STATES PATENT AND TRADEMARK OFFICE
CERTIFICATE OF CORRECTION

PATENT NO. : 7,046,655 B2
APPLICATION NO. : 10/334459
DATED : May 16, 2006
INVENTOR(S) : Marinier et al.

It is certified that error appears in the above-identified patent and that said Letters Patent is hereby corrected as shown below:

Column 4, line 16, after the word "attempt", insert --to--.

Column 6, line 28, after "384", delete "kbps" and insert therefor --Kbps--.

Signed and Sealed this

Twenty-first Day of November, 2006

JON W. DUDAS
*Director of the United States Patent and Trademark Office*